(12) United States Patent
Schultz et al.

(10) Patent No.: US 12,246,457 B2
(45) Date of Patent: Mar. 11, 2025

(54) SYSTEM AND METHOD FOR CONNECTION OF SERVICE LINES TO TRAILER FRONTS BY AUTOMATED TRUCKS

(71) Applicant: Outrider Technologies, Inc., Brighton, CO (US)

(72) Inventors: Jarvis A. Schultz, Golden, CO (US); Matthew S. Johannes, Arvada, CO (US); William L. Spies, II, Westminster, CO (US); Daniel R. Wahl, Chicago, IL (US); Lawrence S. Klein, Bend, OR (US)

(73) Assignee: Outrider Technologies, Inc., Brighton, CO (US)

( * ) Notice: Subject to any disclaimer, the term of this patent is extended or adjusted under 35 U.S.C. 154(b) by 258 days.

(21) Appl. No.: 17/729,305

(22) Filed: Apr. 26, 2022

(65) Prior Publication Data
US 2022/0371199 A1  Nov. 24, 2022

Related U.S. Application Data

(63) Continuation-in-part of application No. 16/282,258, filed on Feb. 21, 2019, now Pat. No. 11,429,099.
(Continued)

(51) Int. Cl.
*B25J 9/16* (2006.01)
*B25J 5/00* (2006.01)

(52) U.S. Cl.
CPC ............ *B25J 9/1697* (2013.01); *B25J 5/007* (2013.01); *B25J 9/1664* (2013.01)

(58) Field of Classification Search
CPC ......... B25J 9/1697; B25J 5/007; B25J 9/1664
See application file for complete search history.

(56) References Cited

U.S. PATENT DOCUMENTS

| 3,881,748 A | 5/1975 | Donaldson |
| 4,366,965 A | 1/1983 | Rhodes |
| (Continued) | | |

FOREIGN PATENT DOCUMENTS

| CA | 2555212 A1 | 9/2005 |
| CN | 106741239 | 5/2017 |
| (Continued) | | |

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. (Year: 2008).

(Continued)

*Primary Examiner* — Gertrude Arthur Jeanglaude
(74) *Attorney, Agent, or Firm* — Loginov & Associates, PLLC; William A. Loginov

(57) ABSTRACT

This invention provides a system and method for allowing motion of a robotic manipulator on an AV truck in connecting to a native gladhand on a trailer front that represents and constructs a model of this free space on-the-fly, in the manner of an Obstacle Detection and Obstacle Avoidance (OD/OA) system and process. A robotic arm on an AV truck is adapted to connect a pneumatic line to a gladhand on the trailer front. A first 3D sensor generates a pointcloud, and is located at an elevated position on the truck to image the trailer front. A second 3D sensor also generates pointclouds at during robot motion, located adjacent to an end of the robotic arm. An occlusion mapping process generates an occlusion map of the trailer front, and a map update process updates the occlusion map to add and remove voxels therefrom to allow safe guidance of the robot.

35 Claims, 11 Drawing Sheets

Related U.S. Application Data

(60) Provisional application No. 62/715,757, filed on Aug. 7, 2018, provisional application No. 62/681,044, filed on Jun. 5, 2018, provisional application No. 62/633,185, filed on Feb. 21, 2018.

(56) References Cited

U.S. PATENT DOCUMENTS

| | | |
|---|---|---|
| 4,448,447 A | 5/1984 | Funk |
| 4,548,783 A | 10/1985 | Dalke |
| 5,305,427 A | 4/1994 | Nagata |
| 5,607,221 A | 3/1997 | Justus |
| 6,179,319 B1 | 1/2001 | Malisch |
| 6,863,538 B2 | 3/2005 | Mattern |
| 7,562,918 B2 | 7/2009 | Toma |
| 7,669,875 B2 | 3/2010 | Halverson |
| 7,748,549 B1 | 7/2010 | Browning |
| 8,187,020 B2 | 5/2012 | Algueera |
| 8,301,318 B2 | 10/2012 | Lacaze |
| 8,532,862 B2 | 9/2013 | Neff |
| 8,727,084 B1 | 5/2014 | Kuker |
| 8,806,689 B2 | 8/2014 | Riviere |
| 8,888,121 B2 | 11/2014 | Trevino |
| 9,068,668 B2 | 6/2015 | Grover |
| 9,211,889 B1 | 12/2015 | Hoetzer |
| 9,302,678 B2 | 4/2016 | Murphy |
| 9,592,964 B2 | 3/2017 | Göllü |
| 10,081,504 B2 | 9/2018 | Walford |
| 11,099,560 B2 | 8/2021 | Smith |
| 11,429,099 B2 | 8/2022 | Smith |
| 11,560,188 B2 | 1/2023 | Moore |
| 2003/0233189 A1 | 12/2003 | Hsiao |
| 2004/0146384 A1 | 7/2004 | Whelan |
| 2005/0017506 A1 | 1/2005 | Caldwell |
| 2005/0103541 A1 | 5/2005 | Nelson |
| 2006/0071447 A1 | 4/2006 | Gehring |
| 2007/0030349 A1 | 2/2007 | Riley |
| 2008/0012695 A1 | 1/2008 | Herschell |
| 2008/0223630 A1* | 9/2008 | Couture ............ B62D 25/2054 901/1 |
| 2008/0262654 A1 | 10/2008 | Omori |
| 2010/0025964 A1 | 2/2010 | Fisk |
| 2011/0037241 A1 | 2/2011 | Temple |
| 2011/0254504 A1 | 10/2011 | Haddad |
| 2012/0248167 A1 | 10/2012 | Flanagan |
| 2014/0007386 A1 | 1/2014 | Liao |
| 2014/0251556 A1 | 9/2014 | Orton |
| 2014/0268095 A1 | 9/2014 | Petkov |
| 2015/0251366 A1 | 9/2015 | Voth |
| 2015/0258908 A1 | 9/2015 | Fukui |
| 2015/0263541 A1 | 9/2015 | Fukui |
| 2015/0328655 A1 | 11/2015 | Reichler |
| 2016/0039456 A1 | 2/2016 | Lavoie |
| 2016/0054143 A1 | 2/2016 | Abuelsaad |
| 2016/0075526 A1 | 3/2016 | Avalos |
| 2016/0260328 A1 | 9/2016 | Mishra |
| 2016/0304122 A1 | 10/2016 | Herzog |
| 2016/0318490 A1 | 11/2016 | Ben Shalom |
| 2017/0031356 A1 | 2/2017 | Bell |
| 2017/0050526 A1 | 2/2017 | Sommarström |
| 2017/0146168 A1 | 5/2017 | Caprio |
| 2017/0165839 A1 | 6/2017 | Tan |
| 2017/0174019 A1 | 6/2017 | Lurie |
| 2017/0185082 A1 | 6/2017 | Matos |
| 2017/0186124 A1 | 6/2017 | Jones |
| 2017/0305694 A1 | 10/2017 | McMurrough |
| 2017/0361844 A1 | 12/2017 | Kahn |
| 2017/0364070 A1 | 12/2017 | Oba |
| 2017/0369260 A1 | 12/2017 | Hoofard |
| 2018/0050573 A1 | 2/2018 | Strand |
| 2018/0202822 A1 | 7/2018 | Delizio |
| 2018/0250833 A1 | 9/2018 | Boria |
| 2018/0264963 A1 | 9/2018 | Dudar |
| 2018/0265076 A1 | 9/2018 | Hall |
| 2018/0281178 A1 | 10/2018 | Jacobsen |
| 2019/0002216 A1 | 1/2019 | Walford |
| 2019/0064828 A1 | 2/2019 | Meredith |
| 2019/0064835 A1 | 2/2019 | Hoofard |
| 2019/0077600 A1 | 3/2019 | Watts |
| 2019/0095861 A1 | 3/2019 | Baldwin |
| 2019/0129429 A1 | 5/2019 | Juelsgaard |
| 2019/0187716 A1 | 6/2019 | Cantrell |
| 2019/0197786 A1* | 6/2019 | Molyneaux ............ G06T 15/06 |
| 2019/0235504 A1 | 8/2019 | Carter |
| 2020/0338942 A1 | 10/2020 | Winograd |
| 2020/0387166 A1 | 12/2020 | Lacaze |
| 2020/0387168 A1 | 12/2020 | Lacaze |
| 2021/0053407 A1 | 2/2021 | Smith |
| 2021/0061304 A1 | 3/2021 | Braunstein |
| 2021/0141384 A1 | 5/2021 | Lacaze |
| 2021/0192784 A1 | 6/2021 | Taylor |
| 2021/0316761 A1 | 10/2021 | Torrie |
| 2021/0380182 A1 | 12/2021 | Delizio |
| 2022/0080584 A1 | 3/2022 | Wicks |
| 2022/0371199 A1 | 11/2022 | Schultz |
| 2024/0043075 A1 | 2/2024 | Johannes |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016] p. 109-p. 112.

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956 &item- - no=I&attribute- id=I7&file- no=2 [retrieved on Nov. 27, 2018] Chapter 9.

* cited by examiner

SYSTEM AND METHOD FOR CONNECTION OF SERVICE LINES TO TRAILER FRONTS BY AUTOMATED TRUCKS

RELATED APPLICATIONS

This application is a continuation-in-part of U.S. patent application Ser. No. 16/282,258, filed Feb. 21, 2019, entitled SYSTEMS AND METHODS FOR AUTOMATED OPERATION AND HANDLING OF AUTONOMOUS TRUCKS AND TRAILERS HAULED THEREBY, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines has typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

Commonly-assigned, U.S. patent application Ser. No. 17/009,620, entitled SYSTEMS AND METHODS FOR AUTOMATED OPERATION AND HANDLING OF AUTONOMOUS TRUCKS AND TRAILERS HAULED THEREBY, filed Sep. 1, 2020, now U.S. Published Application No. US-2021-0053407-A1, teaches novel arrangements for using robotic, multi-axis arm-based manipulators to connect and disconnect (typically pneumatic) service lines between the AV truck and a so-called gladhand connection on the trailer front. This application is incorporated herein by reference as useful background information. More particularly, it is desirable to provide mechanisms for connecting the truck lines a so-called native gladhand that is free of adapters or attachments other than the conventional flange and seal arrangement that allows such to form a gas-tight seal with another gladhand on the AV truck. The attachment and detachment is performed using a rotational motion between confronting gladhands to lock flanges together in a manner that compresses opposing annular seals contained in each gladhand body. The above-referenced Published Application describes end effectors and robotic hands that facilitate the attachment of a gladhand adapter to the native trailer front-mounted gladhand. As part of the attachment process, the native gladhand should be identified. Machine vision, employing pattern recognition based upon acquired images of the trailer front, can be used (at least in part) to identify and locate the trailer gladhand.

However, the manipulation of a robotic arm on the AV truck can entail a series of motions that relay on a certain geometry to exist on the hatched trailer front. The system that controls the robot should, thus, able to generate collision-free motion plans using information about the current environment. There is a great deal of variability in what can be considered "free space" for the robot to move due to variations in trailer body geometry, kingpin depth, fifth-wheel height, trailer angle, and more. For example, in the case of reefer trailer bodies, refrigeration units may be located on the upper area of the trailer front and form an overhanging bulge that makes the area in which the gladhand(s) reside more restrictive for arm motion.

SUMMARY OF THE INVENTION

This invention overcomes disadvantages of the prior art by providing a system and method for allowing motion of a robotic manipulator on an AV truck in connecting to a native gladhand on a trailer front that represents and constructs a model of this free space on-the-fly, in the manner of an Obstacle Detection and Obstacle Avoidance (OD/OA) system and process.

In an illustrative embodiment, a system and method for guiding a robotic arm on an AV truck, and AV (e.g. yard) truck, adapted to connect a pneumatic line to a gladhand on the trailer front hitched thereto is provided. A first 3D sensor generates pointclouds, at different stages of motion, and is located adjacent to an end of the robotic arm, the end carrying a tool for interacting with the gladhand. An occlusion map of the trailer front is generated, and a map update process that, based upon the pointclouds of the first 3D sensor, updates the occlusion map to add and remove voxels therefrom. A robot arm control process guides the robotic arm based upon the updated occlusion map. Illustratively, a second 3D sensor generates a pointcloud, and is located at on the truck to image the trailer front. An occlusion mapping process, based upon the pointcloud of the second 3D sensor, generates the occlusion map of the trailer front. The second 3D sensor can be located at an elevated position on the truck. The robot arm control process can be adapted to initially move the robotic arm to image, with the first 3D sensor, a region of interest subject to update by the update process. The first 3D sensor generates images used to locate predetermined features in the region of interest. The predetermined features of the system and method can include the gladhand. The gladhand can be a rotating gladhand and the tool is adapted to extend the rotating gladhand upon recognition of such as one of the predetermined features. The second 3D sensor can comprise a combination of a rotating 2D LiDAR and a moving pan-tilt unit. The first 3D sensor can comprise a stereoscopic camera arrangement. A map expansion process can change an occlusion probability of each of the voxels in the updated occlusion map based upon occlusion state of neighboring voxels in the updated occlusion map. At least one of the first 3D sensor and the second 3D sensor can be adapted to perform self-calibration during runtime operation based upon features within an imaged scene. Illustratively, a path of motion of the robotic arm can be guided based, in part, on at least one of (a) moving the robotic arm along a trajectory until a rising or falling edge on an external switch is sensed, (b) moving the robotic arm along a trajectory whose speed is controlled by wrench readings from an end-of-arm force-torque sensor, (c) moving the robotic arm along a predetermined trajectory while monitoring end-effector wrenches and stopping the arm if it is determined that there is a risk of causing a controller of the robotic arm to fault, (d) moving the robotic arm along a predetermined trajectory to produce a target end-effector wrench, and (e) stopping the motion for any of (a)-(d) if a motion trajectory of the robotic arm has exceeded distance thresholds. The predetermined feature can comprise a gladhand, and the occlusion on the trailer front can be caused by a protrusion from the trailer front that overhangs the gladhand

BRIEF DESCRIPTION OF THE DRAWINGS

The invention description below refers to the accompanying drawings, of which.

DETAILED DESCRIPTION

I. Overview

Figure 1:
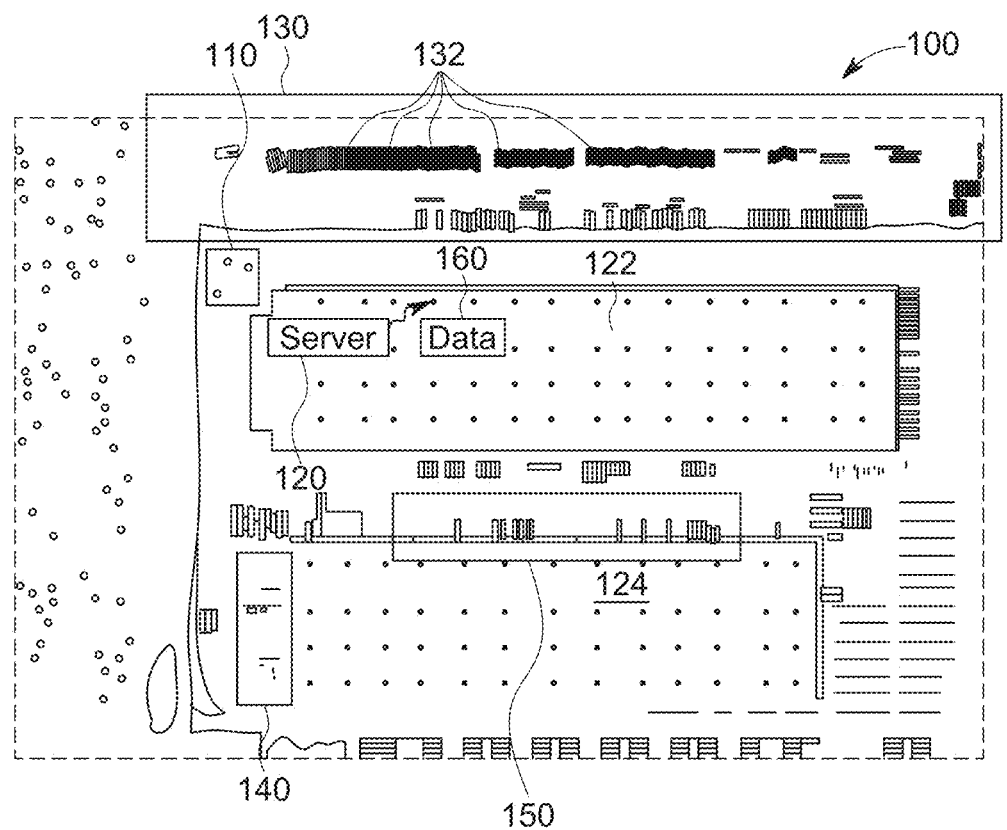
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside on the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth ($5^{th}$) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 100. It is backed into a loading bay in this area, and the opened rear is brought into close proximity with the portal and cargo doors of the facility. Manual and automated techniques are then employed to offload the cargo from the trailer for placement within the facility 100. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 100. The trailer, with rear swing (or other type of door(s)) open, is backed into a loading bay and loaded with goods from the facility 100 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors (described below) on the AV yard truck and/or other manual or automated data collection devices—for example, terrestrial and/or aerial camera drones.

Figure 2:
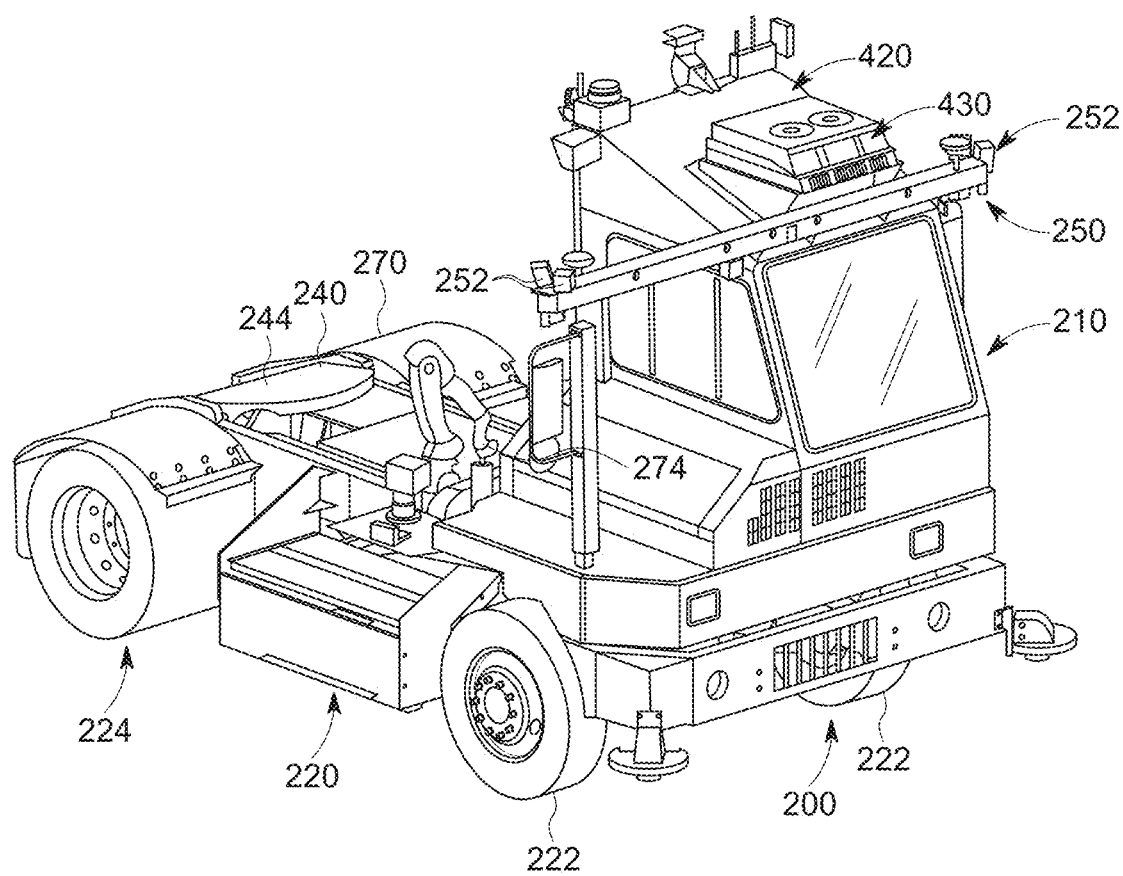
FIG. 2 is a front-oriented perspective view of an exemplary AV yard truck for use in association with the system and method herein.
Figure 3:
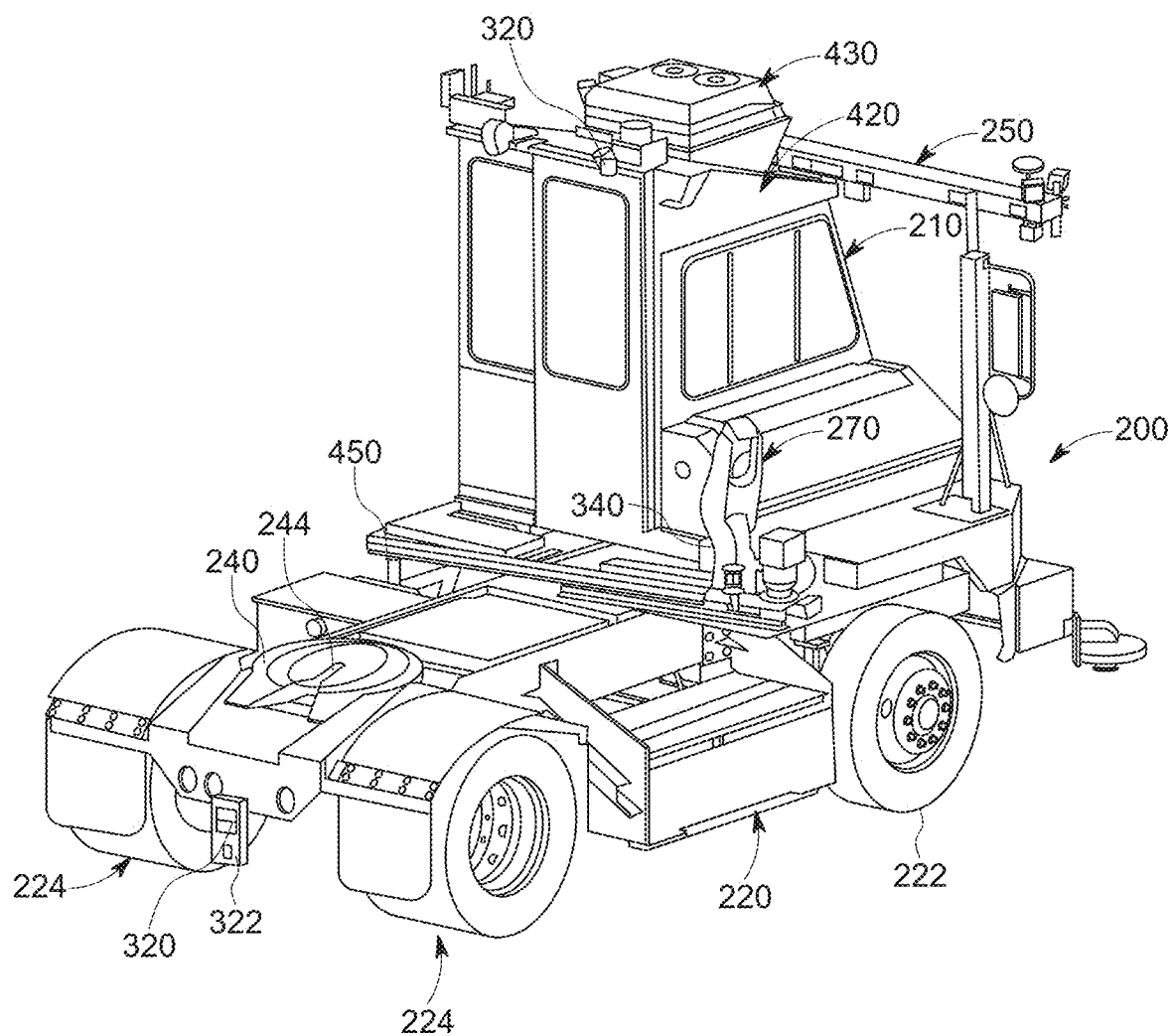
FIG. 3 is a rear-oriented perspective view of the AV yard truck of FIG. 2.
Figure 4:
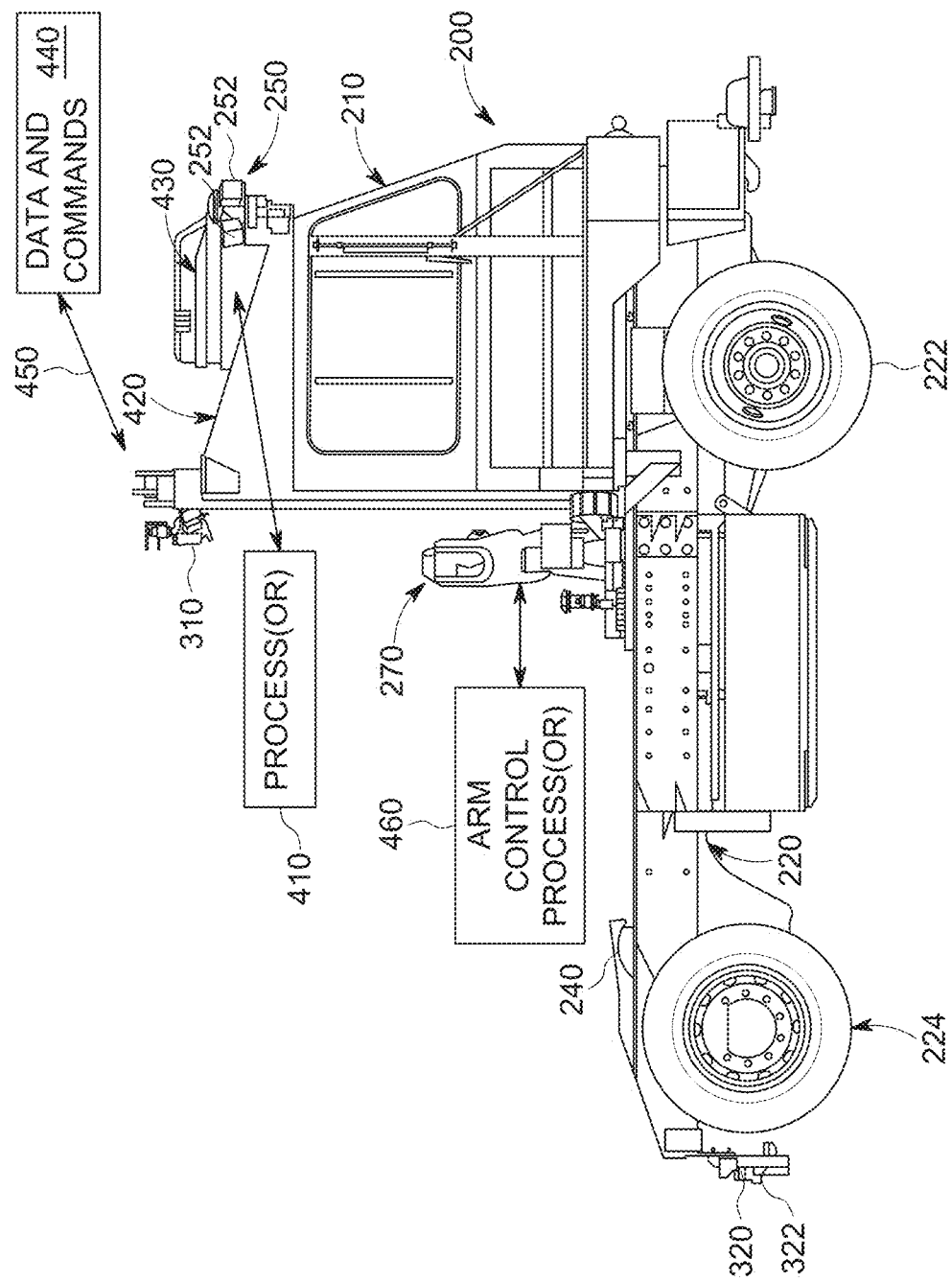
FIG. 4 is a side view of the AV yard truck of FIG. 2.

Having described a generalized technique for handling trailers within a facility reference is now made to FIGS. 2-4, which show an exemplary AV yard truck 200 for use herein. The yard truck 200 is powered by diesel or another internal combustion fuel, or (more typically) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200 includes at least a driver's cab section 210 (which can be omitted in a fully autonomous version) and steering wheel (along with other manual controls) and a chassis 220 containing front steerable wheels 222, and at least one pair of rear, driven wheels 224 (shown herein as a double-wheel arrangement for greater load-bearing capacity). The respective chassis 220 also includes a so-called fifth ($5^{th}$) wheel 240 that is arranged as a horseshoe-shaped pad with a rear-facing slot 244, which is sized and arranged to receive the kingpin hitch located at the bottom front (510 in FIG. 5) of a standard trailer 500. The fifth wheel 240 shown tilted downwardly in a rearward direction so as to facilitate a ramping action when the AV truck is backed onto the trailer. Various fifth wheel-lifting mechanisms can be provided, which employ appropriate hydraulic lifting actuators/mechanisms known to those of skill so that the hitched trailer is raised at its front end. In this raised orientation, the hitch between the truck and trailer is secured.

The AV yard truck can include a variety of custom or commercially available remote sensors and/or autonomous driving sensing arrangements (e.g., those available from vendors, such as Velodyne Lidar, Inc. of San Jose, CA), including, but not limited to GPS, LiDAR, radar, image-based (e.g. machine vision), inertial guidance, and ultrasonic that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.). One example of sensor placement is shown and described in U.S. patent application Ser. No. 17/511,087, entitled PROCESSOR AND SENSOR ARRAY FOR AUTONOMOUS TRUCK, filed 10/26/2021, the teachings of which are incorporated by reference as useful background information. The exemplary AV yard truck 200 includes a novel top-mounted bar 250 that carries various sensors (e.g. visual imaging sensors and LiDAR) in a manner that affords a desirable line of sight. For example visual sensors 252 are provided on ends of the bar 250 and a rear visual sensor 310 (FIG. 3) is provided at the top of the cab, and is used as part of the trailer connection system as described below. A rear bumper visual sensor 320 and LiDAR sensor are also depicted to aid in backup and hitching operations. Other sensors as described in the above-incorporated U.S. patent application Ser. No. 17/511,087 are also provided around the truck chassis 220 and cab 210. The processing components 410 (also termed "processor") for various sensing telemetry can be housed in the cab roof cap 420, which is wedge-shaped in this embodiment. It can include a cooling (e.g. fan) unit 430 and appropriate heat sinks to remove excess heat generated by data processing, storage and transceiver components. As also shown the processor(s) 410 receive and transmit data and commands 440 via an RF link 450 as described above.

Notably, the AV yard truck 200, includes an emergency brake pneumatic hose (typically red) 340 (shown in phantom in FIG. 3), service brake pneumatic hose (typically blue, not shown) and an electrical line (often black, not shown), that extend from the rear of the cab 210. This allows arrangement for access by yard personnel when connecting and disconnecting the hoses/lines from a trailer during the maneuvers described above.

In operation, control of the truck 200 can be implemented in a self-contained manner, entirely within the processor 410 which receives mission plans and decides on appropriate maneuvers (e.g. start, stop, turn accelerate, brake, move forward, reverse, etc.). Alternatively, control decisions/functions can be distributed between the processor 410 and a remote-control computer—e.g. the server 120, that computes control operations for the truck and transmits them back as data to be operated upon by the truck's local control system. In general, control of the truck's operation, based on a desired outcome, can be distributed appropriately between the local processor 410 and the facility system server 120.

II. PNEUMATIC LINE CONNECTION BETWEEN YARD TRUCK AND TRAILER

The AV truck chassis 220, rearward of the cab 210, includes an area that resides in front of the fifth wheel 240 that supports a multi-axis robotic manipulator arm assembly 270 that move in three dimensions (e.g., 7 degrees of freedom (DOF)) in a programmed path according to conventional robotic behavior. The arm assembly 270 is mounted on a track 450 that enables powered, lateral motion across the width of the chassis 220. The arm assembly 270 can be based upon a conventional robot, such as the GP7, available from Yaskawa America, Inc. of Waukegan, Il. The end of the arm assembly can include a customized end effector assembly that is arranged to selectively grasp a native gladhand 520 in FIG. 5) on the trailer front 530, and attach a corresponding gladhand (i.e. and adapterless implementation), or structure with a gladhand-engaging adapter on the end of the hose 340, so as to complete an emergency brake pneumatic circuit between the AV yard truck 200 and the trailer 500. Other connections can be made by the robotic arm, e.g. between the service brake lines and/or the electrical connections using appropriate motion control and adapters. More generally, the attachment of AV truck pneumatic lines to various types of native gladhands is shown and described in above-incorporated commonly-assigned, U.S. patent application Ser. No. 17/009,620, now U.S. Published Application No. US-2021-0053407-A1. It should be clear that the end effector 274 can define a variety of shapes and functions, depending upon the nature of the task and type of adapter used to connect the AV truck pneumatic line to the native gladhand on the trailer front. Likewise, the number of axes and motion capability of the arm 270 is highly variable, depending upon the nature of the task and relative location of the robot versus the trailer gladhand. In general, the robot 270 is positioned on the chassis 220 in such a manner that it can be stowed without (free of) interfering with normal turning of the trailer on its kingpin when hitched to the AV yard truck 200. The tracking 450 can be angled rearwardly from one side to the other (as shown) to help facilitate forward stowage of the robot 270 when not in use (as shown). As described further below, the robot arm 270 moves under the control of a processor arrangement 460 they can be contained within the robot housing or (in whole or in part) provided as part of the overall processing arrangement 410. Note that any of the processing functions herein can be performed in the stand-alone fashion on the AV yard truck 200, or can be partially performed remotely by the server 120 for the yard.

III. CONNECTION ROBOTIC ARM CONTROL AND SENSING SYSTEM

A. Scanning and Processor Arrangement

Figure 6:
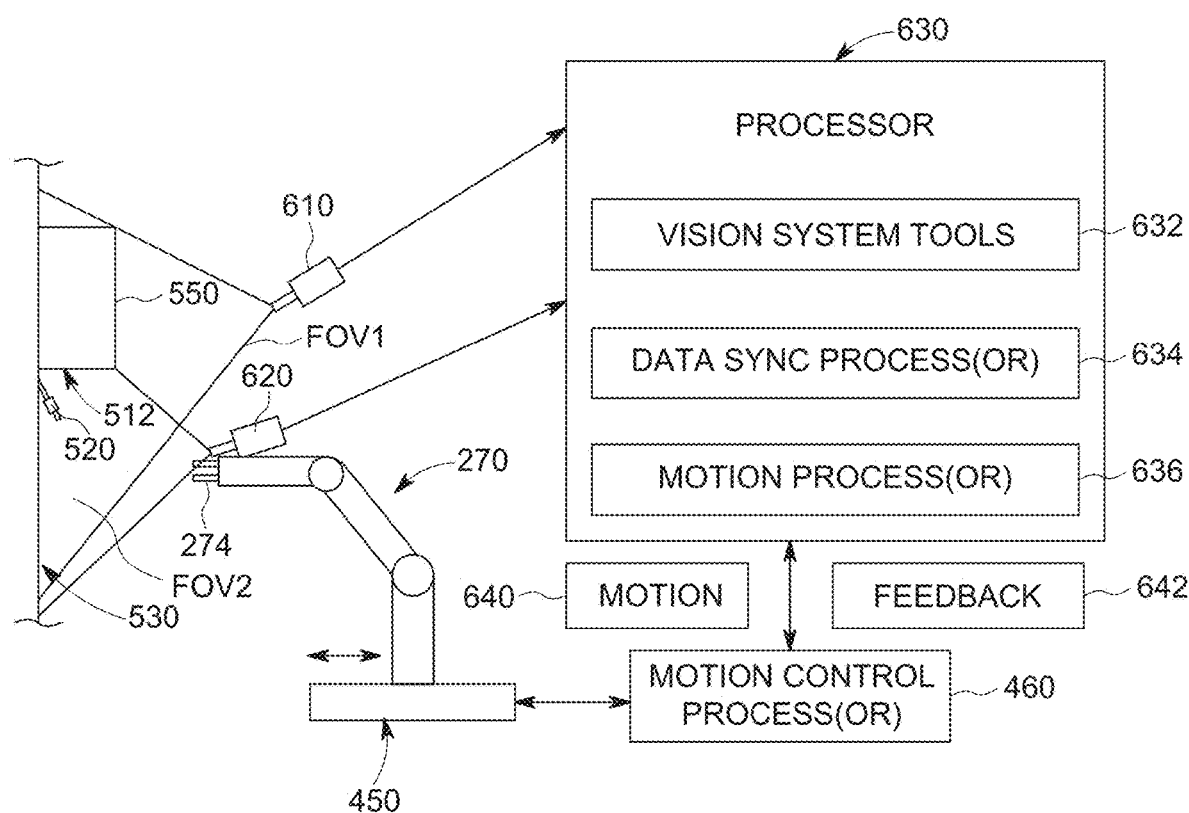
FIG. 6 is a schematic diagram of a AV yard truck robotic pneumatic line connection system and environment scanning arrangement to assist in navigating the connection system to and from a trailer-front-mounted pneumatic gladhand.

Reference is made to the arrangement 600 in the schematic diagram of FIG. 6, which shows a sensing system, which consists of two primary sensors, an external environment scanner 610 (which includes the above-described rear cab visual sensor 310) and an end-of-arm (270) environmental scanner 620. Both scanners 610 and 620 are capable of generating 3D pointclouds of an imaged scene within a respective 3D field of view/region of interest FOV1 and FOV2. These pointclouds are transmitted to the processor arrangement, and more particularly to an environmental sensing process(or) 630, that can be instantiated, in whole or part, in the processor arrangement 410 and/or on the remote server. Pointcloud data in the external environment processor 630 is handled by various functional modules that can be implemented using hardware, software (comprising a computer-readable medium of non-transitory program instructions) or a combination of hardware software. The functional processor/process modules 632, 634 and 636 depicted in the processor 630 are exemplary of a variety of organizations of processors and/or processing tasks that can be implemented according to skill in the art. As shown the processor includes various 2D and 3D vision system tools 632, adapted to derive information from 3D point clouds. These can include surface contour tools, edge finders, 3D blob tools, trained deep learning tools, etc. Appropriate setup and calibration functions can also be included. A data synchronization processor 634 coordinates data from each scanner 610, 620 as described below and a motion processor 636 coordinates movement of the robot end effector 274 to the visual environment. Data in the form of motion commands 640 and position feedback 642 (from the robot's steppers, encoders, etc.) are exchanged with the robot's motion control processor 460 to guide and track robot arm motion between a stowed position and various engaged positions relative to the trailer gladhand.

Figure 5:
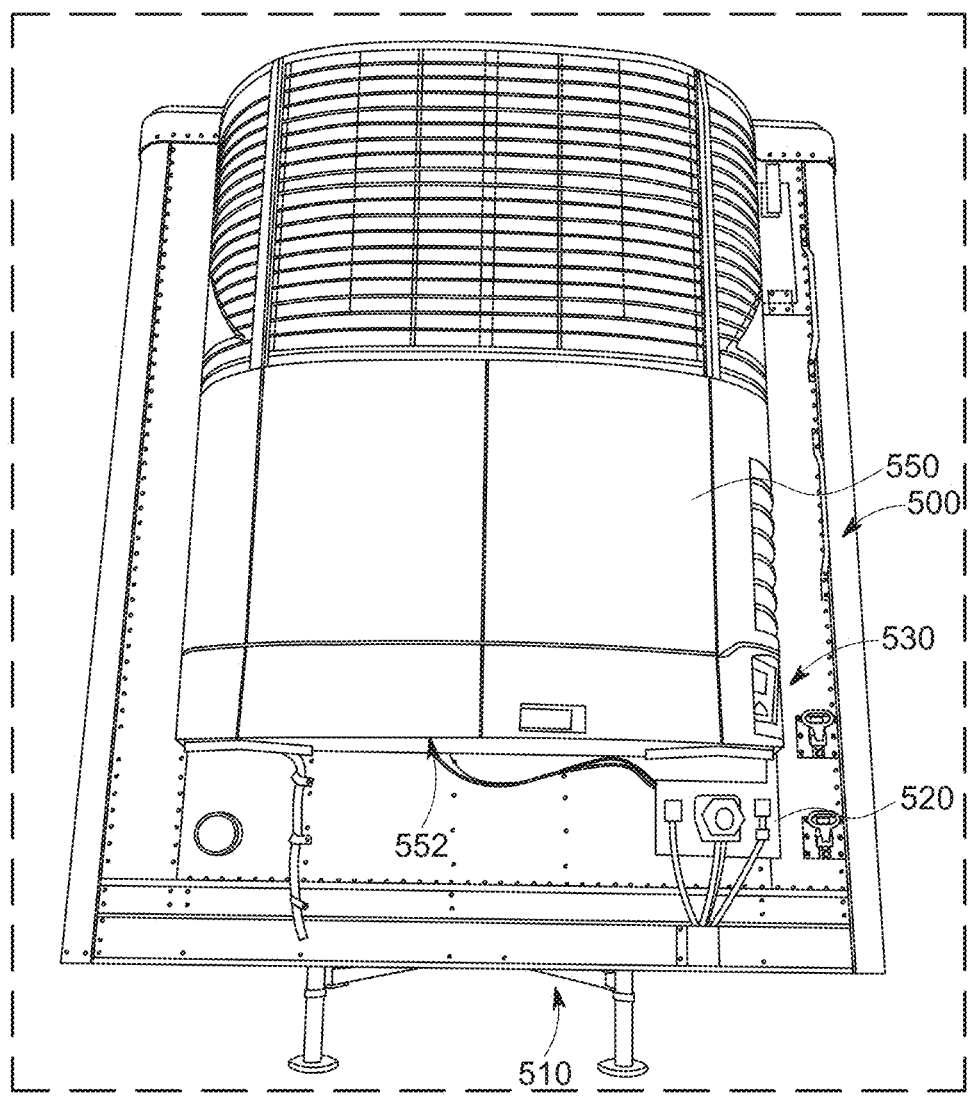
FIG. 5 is front view of a front end of an exemplary trailer having a refrigeration unit that overhangs the gladhand area.

Notably, as shown in FIGS. 5 and 6, the exemplary trailer front 530 is part of a reefer unit that includes overhanging bulge or blister housing 550 that terminates at a bottom edge 552, just above the gladhand 520. As described below the robot arm assembly 270 and end effector 274 must navigate this restricted space to appropriately engage the gladhand 520.

The cab-mounted scanner 610 can be constructed using any acceptable 3D sensing arrangement. By way of non-limiting example, the cab-mounted scanner 610 consists of a SICK TiM-561 2D LiDAR and a FLIR PTU-5 (movable) pan-tilt unit (PTU). By controlling the motion of the PTU and synchronizing the data received from the LiDAR with the sensed positions of the PTU the process is capable of building full 3D pointclouds. This somewhat conventional technique is sometimes referred to as a "rotating 2D LiDAR". The end-of-arm environment scanner 620 can be a conventional depth camera based on (e.g.) active stereoscopic vision. Further, by way of non-limiting example, the end-of-arm scanner can comprise a RealSense™ depth camera module commercially available from Intel.

The process herein can utilize an "occupancy map" to decompose the space of interest into a set of finite-sized (3D) voxels. For each voxel there is a parameter that describes the probability of that voxel being occupied or not. A probabilistic update rule and probabilistic sensor model are used to update each individual voxel's occupational probability as successive pointclouds are added to the occupancy map. In general, if a pointcloud added to the occupancy map has no points within a given voxel that will lower its probability of occupation, points within a voxel will increase its probability of occupation. The data structures and algorithms for storing, querying, and updating the occupancy map are well-known and there have been many papers published on the topic. For reference, the exemplary implementation herein utilizes the well-known open source library OctoMap released along with the paper Armin Hornung, et al., An Efficient Probabilistic 3D Mapping Framework Based on Octrees, Autonomous Robots (2013), which is incorporated herein by reference as useful background information.

B. Occlusion Filling

Figure 7:
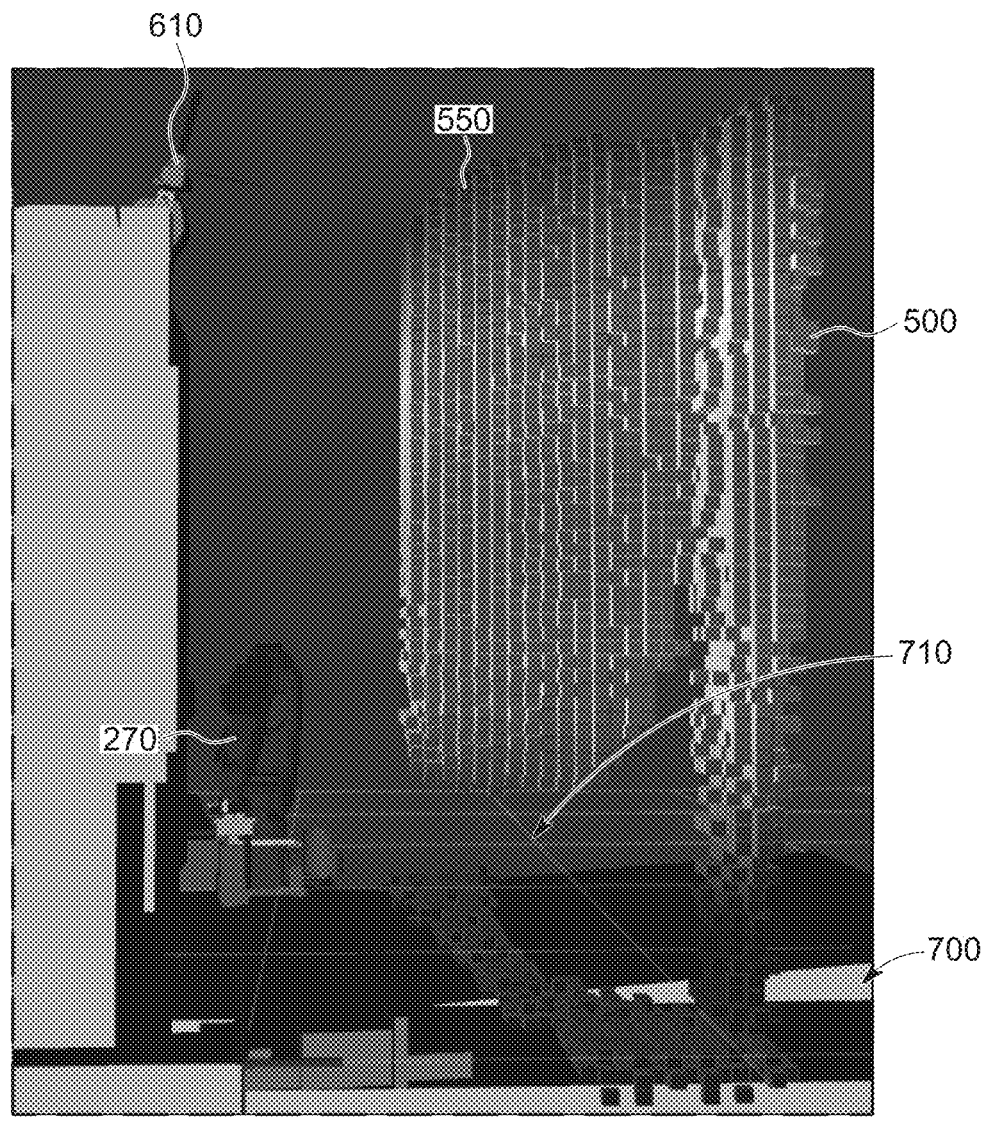
FIG. 7 is a diagram of an image showing an occupancy map of voxels generated by the scanning system of FIG. 6 for the trailer front of FIG. 5.

It is highly desirable that the path of travel of the robot arm 270 and associated end effector 274 avoid collisions with the trailer assets that it operates upon. An illustrative technique employs the concept of occlusion filling. Sometimes, due to line-of-sight, both of environment scanners 610 and 620 can suffer from occlusions. In this situation, an object in the foreground can block objects in the background leading to a lack of data in any given pointcloud generated by a scanner. Hence, FIG. 7 shows an image 700 of the reefer trailer 500 of FIG. 5 along with the occupancy map produced by the external environment scanning system when the robot arm 270 attempts to connect to that trailer. Note that a large area 710 of unoccupied voxels below the refrigeration unit 550 that are occupied in real life. They appear as unoccupied in the map because they are occluded by the refrigeration unit 550 itself.

The illustrative embodiment herein provides a technique to modify the raw occupancy map 700 of FIG. 7 in order to define a more conservative motion plan of the robot arm 270 in response to these occlusions. If the point-of-view of a sensor that produced a pointcloud is known, it is possible to compute which voxels in the occupancy map were occluded when that pointcloud was generated. In order to be safe with respect to these occluded voxels, the probability of occlusion is maximized in the computation. Not all voxels are considered occluded by the occupancy mapping process. Constraints are, thus, applied to the set, as otherwise, the occupancy map could extend into infinite space. Hence, a radius of analysis is defined, and occluded voxels within that radius are assumed to be occupied and all occluded voxels beyond that radius are unchanged. As such, the process assumes that any voxel that is not visible to the scan within the radius is occupied to prevent the motion planning algorithms from attempting to use unknown space as occupied space. This capability can be handled on-demand. Given the current state of the occupancy map, it is possible to fill all occluded voxels given a sensor point-of-view and a radius of analysis. A visualization of this operation is shown in the respective images 800 and 900 of FIGS. 8 and 9.

Figure 8:
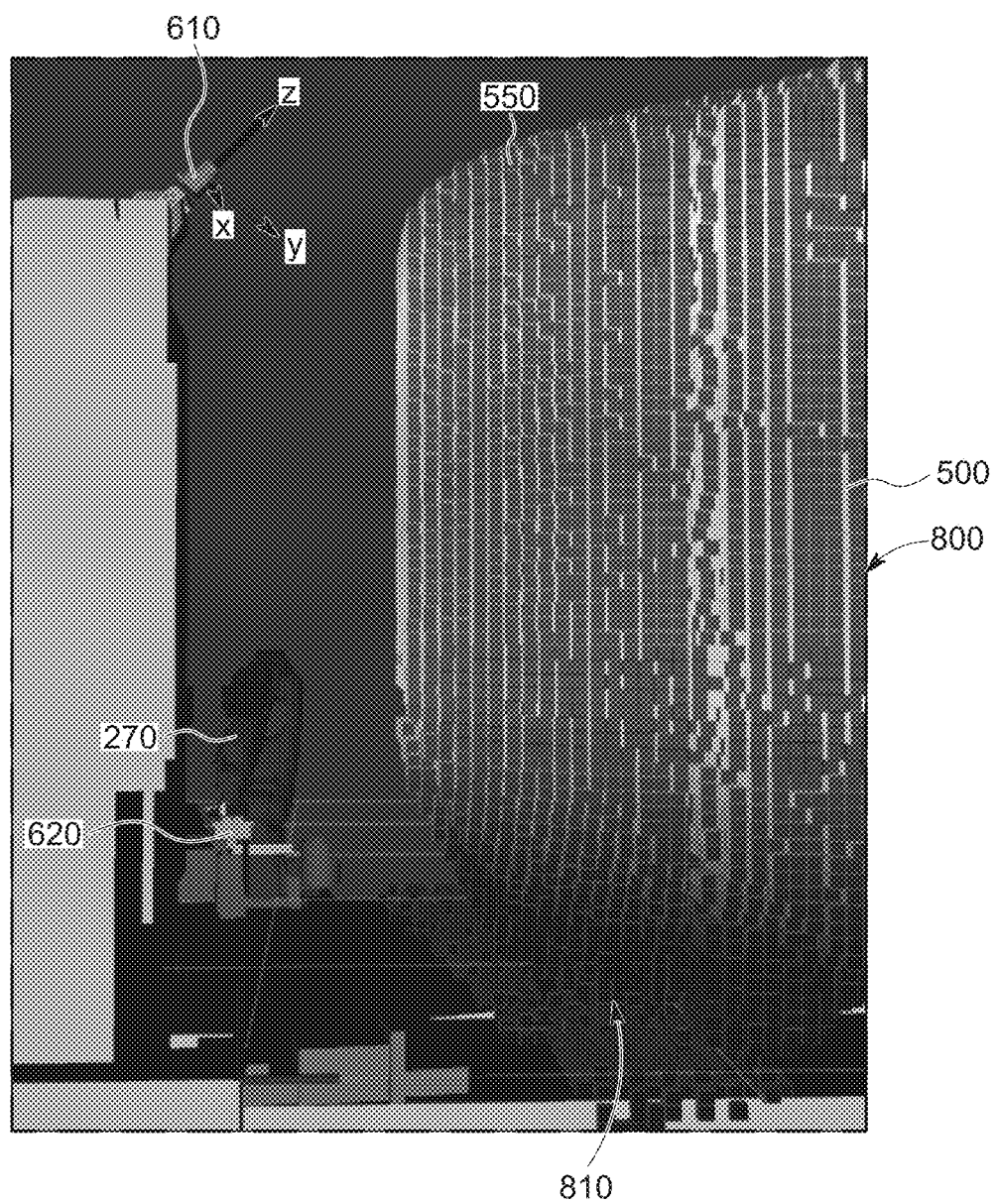
FIG. 8 is a diagram of an image showing the occupancy map of FIG. 7 including voxels defining an occluded region.
Figure 9:
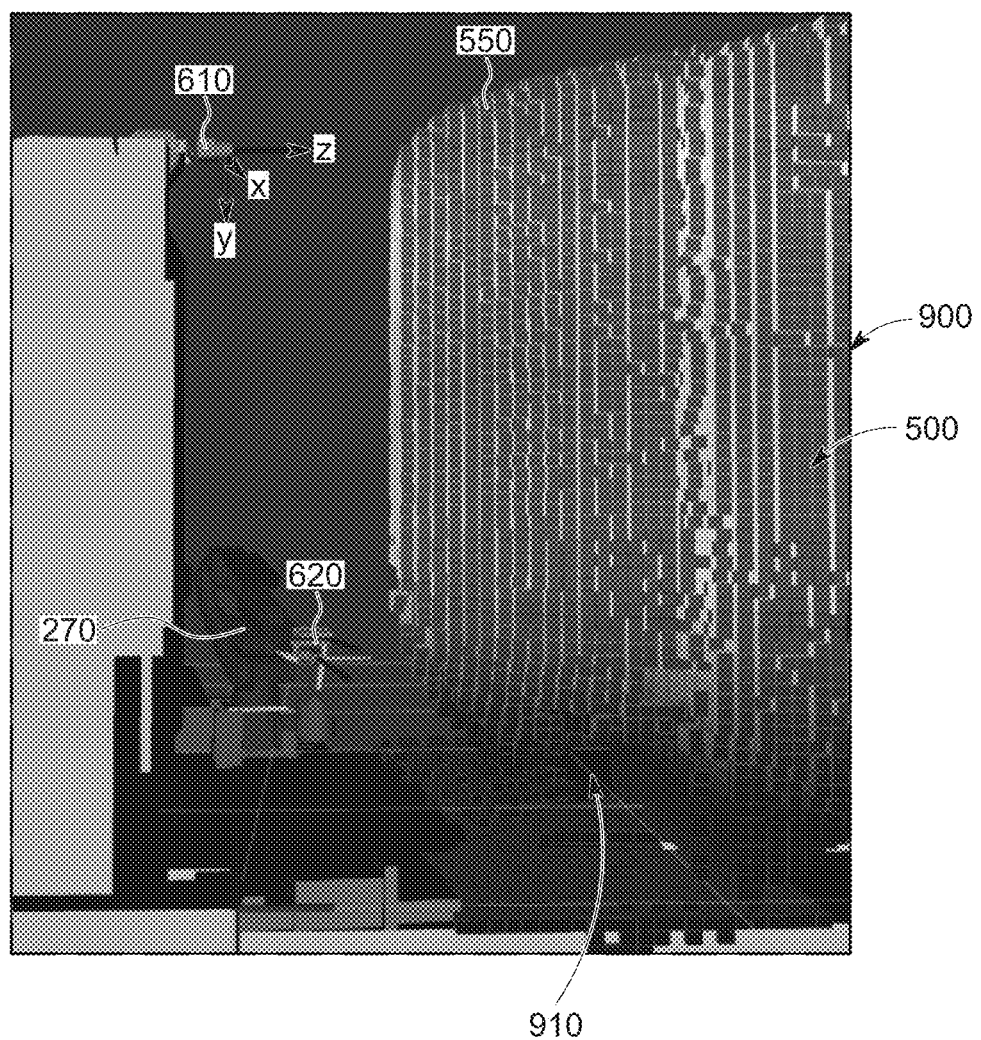
FIG. 9 is a diagram of an image showing the occupancy map of FIG. 8 including a cleared region of voxels in which the AV-truck-mounted robotic arm for connecting pneumatic lines with the trailer can safely operate based upon pointclouds derived by an end-of-arm environment 3D sensor.

As shown in FIG. 8, the occlusion filling process fills the occupancy map shown in the image 700 of FIG. 7 with candidate occlusions (lower region 810) from the point-of-view of the external environment scanner 610 on top of the cab (defining an XYZ coordinate system—with X being perpendicular to the page) up to a defined radius to produce the overall occupancy map. However, it is recognized that this occlusion-filled occupancy map is essentially too conservative in the sense that there are voxels considered to be occupied that are actually free, and this condition will unduly restrain the initial motion of the robot arm 720 and end effector 724 with associated end-of-arm scanner 620. Hence, a selective updating process is employed, which is described in further detail below. This selective updating process adds pointclouds derived from the end-of-arm environment scanner 620, and thereby, updates the occupancy probability. Thus, as shown in the image of FIG. 9, the end-of arm scanner 620 has moved into a position to image the region (810 in FIG. 8) that was filled with occlusion candidates. As voxels that were previously occluded and filled become visible to the end-of-arm scanner 620, their occlusion probabilities are updated accordingly and will eventually reflect unoccupied voxels. Hence, in the updated occupancy map in the image 900 of FIG. 9, an area 910 of voxels below the overhanging refrigeration unit 550 that were previously occupied are now cleared through the addition of end-of-arm pointclouds.

C. Selective Updating

Figure 10:
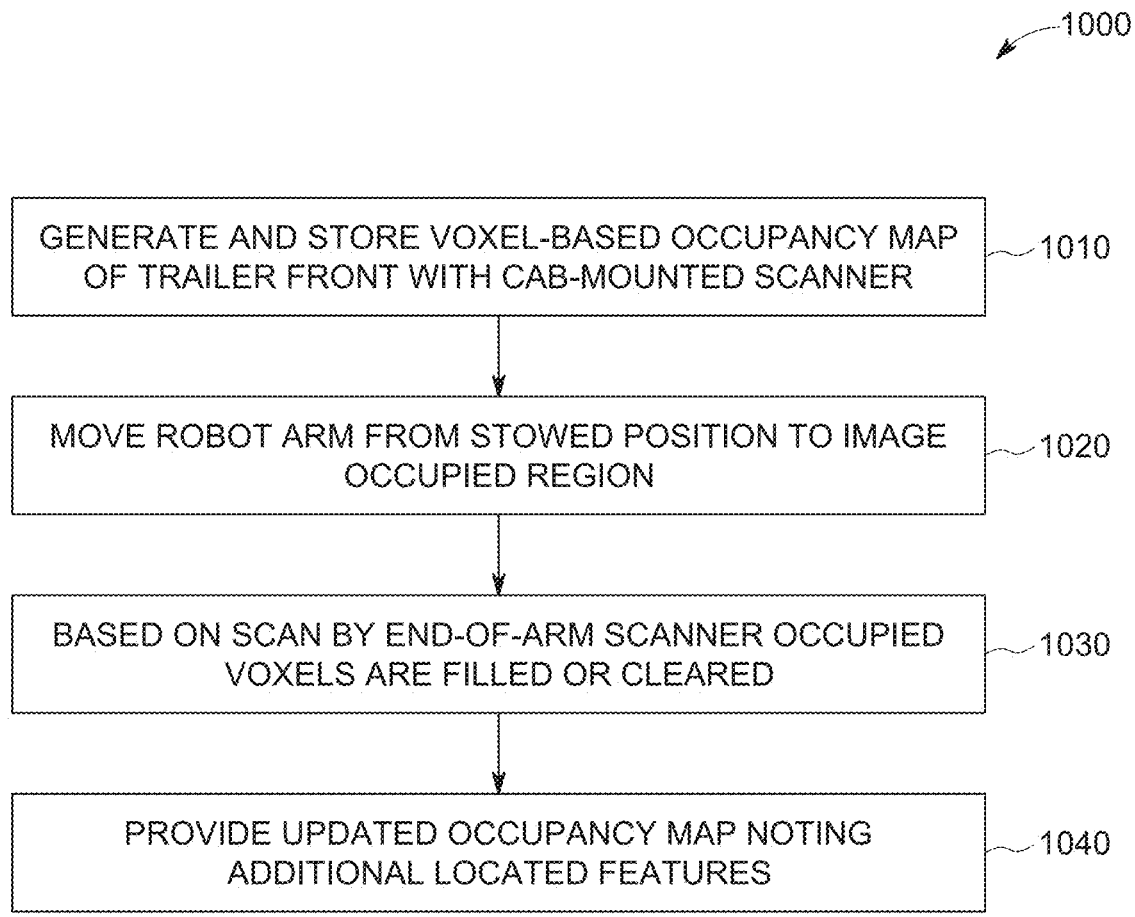
FIG. 10 is a flow diagram of an overall procedure for generating an updated occupancy map in accordance with FIG. 9.

One downside to the occlusion filling process as described above is that it can be too conservative in filling the occluded space. It is likely that some voxels that are unoccupied in the real world were considered to be occupied simply because they were occluded. It is also possible that those cells could falsely lead to motion planning failures if they are in spaces that we need to move our manipulation system into. So the process includes a selective updating capability. This capability allows us to add an arbitrary number of pointclouds from either environmental scanner to our occupancy map and update the voxel probabilities accordingly. There are also options for defining regions-of-interest where only pointcloud points within that region are added to the occupancy map. These regions of interest are parameterized by several shape primitives (spheres, cylinders, 3D bounding boxes, etc.). Reference is made to the flow diagram of FIG. 10 showing the overall procedure 1000, in which these two techniques are combined.

In step 1010, the procedure 1000 generates and stores an initial occupancy map with voxels from the cab-mounted environment scanner (PTU) 610. Then, in step 1020, the robot arm is moved based upon the location of the occluded region under control of the robot control processor so as to image that occluded region moving the arm from its stowed position. The arm initially move conservatively based upon the initial occluded occupancy map and used its end-of-arm scanner to create 3D pointclouds of the occluded region. As the arm 720 navigates the space searching for target objects (gladhands, tools, etc.), using various vision system tools (pattern recognition, deep learning, etc.), the pointclouds generated by the end-of arm scanner 620 allow for continual update of the occupancy map (step 1040) by adding pointclouds from the end-of-arm environmental scanner in regions of interest around our target objects.

D. Map Expansion

Figure 11:
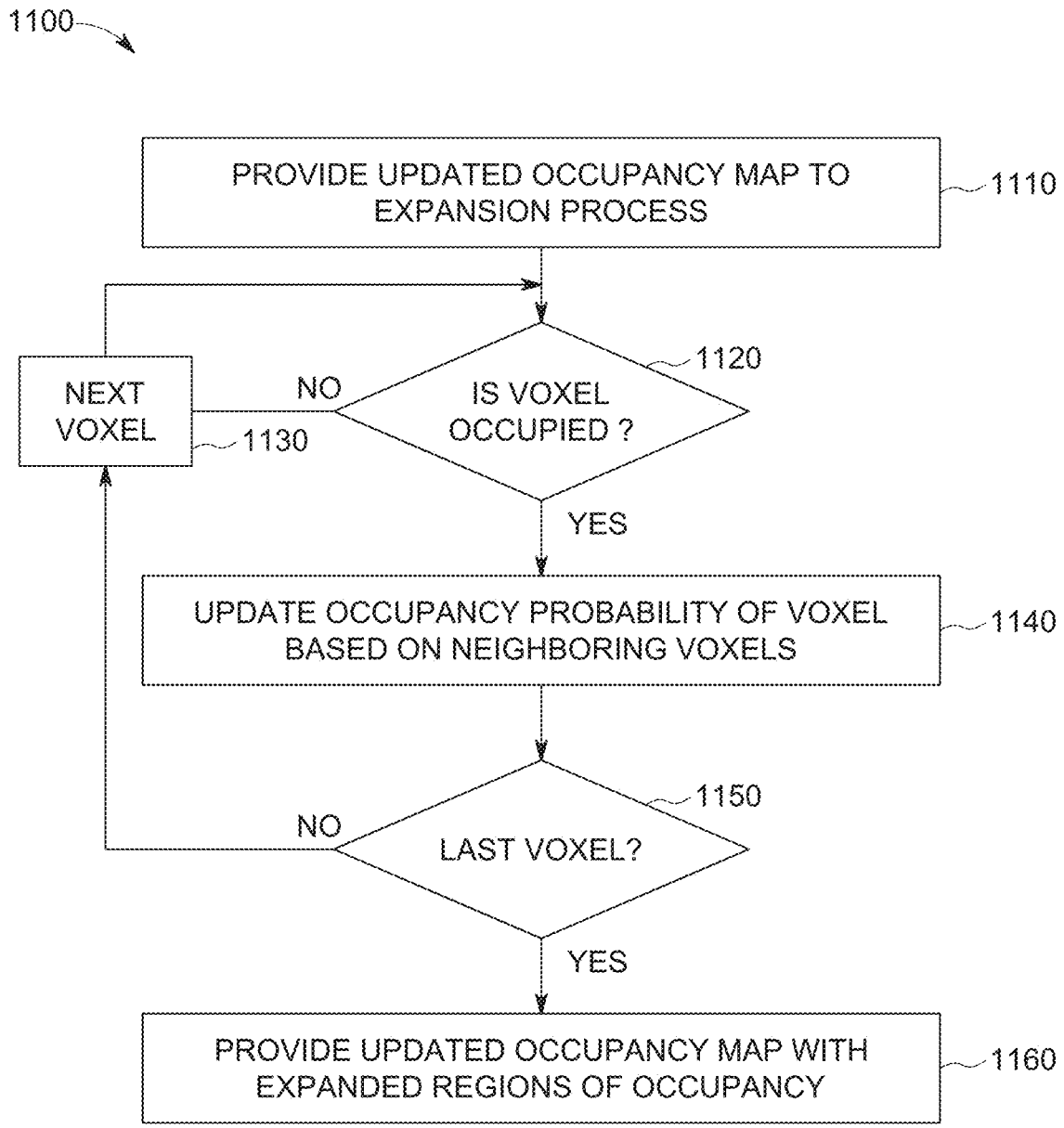
FIG. 11 is a flow diagram of an occlusion map expansion procedure for increasing a margin of operational safety within the updated occlusion map of FIG. 9.

The occupancy map is defined to have a minimum voxel size. In the real world, due to a variety of factors such as sensor noise or imperfect calibrations it's possible to end up with voxels that are not occupied even though they should be. For example, if a boundary of a particular voxel happens to be very close to a real-world object. If the scanning sensor exhibits a small amount of noise then it is possible that, from one scan to the next, a point in the pointcloud from that real-world object could jump from one side of the voxel boundary to the other. In other words, it is possible that, for a given scan, a real-world object inside of a given voxel appears to belong to a different voxel and we would incorrectly fail to consider the correct voxel as occupied. This is why most occupancy map implementations known to those of skill consider probabilistic sensor models and voxel updates. However, to add robustness to occupancy mapping process of the illustrative embodiment, a map expansion technique is provided herein, and as shown in the procedure 1100 of FIG. 11. In this technique the updated occupancy map is provided to the expansion process (step 1110), and is modified to expand all occupied voxels (decision step 1120—if unoccupied, then search for next voxel in step 1130) by a given number of neighboring voxels (step 1140). Thus, in operation, if a particular voxel is considered to be occupied (via decision step 1120), the process takes into account neighboring cells within a radius and update their occupancy probability to match that of the starting cell. It runs until all voxels of interest have been expanded (step 1150). In this manner, the expansion process can inflate the occupancy map in all directions to provide a degree of padding around detected obstacles (step 1160). The process also tracks which voxels which were modified by this operation, and thus can undo the expansion in part or in the entirety E. Adjustable Density Scanning As described above, the external environmental scanning system 610 consists of a controllable pan-tilt unit (PTU) and a 2D LiDAR. A benefit to this arrangement (as opposed to a commercially available 3D LiDAR or depth camera) is that it can provide pointclouds of varying density and in a controllable region. Since the LiDAR returns sensor readings at an approximately constant rate, the process can modify the path that the LiDAR sweeps through and the speed with which it is moving to control the pointcloud extents and density. Thus, for example, when building the initial occupancy map the unit can scan a relatively large region to build a map of the entire hitched trailer asset (e.g. trailer front). Since the process is expanding and occlusion-filling this map to provide robustness, it can move the PTU relatively quickly and yield a less-dense pointcloud. This saves execution time and processing power. However, in situations where a highly dense pointcloud is desired it can choose to move the PTU much slower and in a different region. For example, if the goal is to build an accurate 3D representation of a particular feature on the trailer, e.g. for planning motions very close to the feature or for 6D pose estimation of the feature the process can choose to move the scanner 610 slowly over a narrow region to build a high-density and narrow field-of-view pointcloud.

IV. CALIBRATION OPTIMIZATION AND MONITORING

The hose connection system and method system dictates several extrinsic calibrations that should be undertaken for each vehicle and provided to the controlling processes herein. These calibrations include: (a) the 3D pose of the end-of-arm environmental scanner relative to the arm's tool-center point—which can be termed the camera calibration; and (b) the pose of the external environmental scanner relative to a fixed frame on the vehicle—which can be termed the PTU calibration.

The above calibrations are desired for obstacle detection and obstacle avoidance (OD/OA). They also form a critical component of our perception systems that determine the 6D poses of various target objects in the world (tools, gladhands, etc.). The process can access a toolbox that utilizes an arm motion generation algorithm, a perception system, and an optimization procedure. Such procedures are known in the art as 3D hand-eye-calibration based upon a global/world coordinate space. Such techniques can be largely conventional in application and/or custom techniques can be employed to supplement conventional calibration techniques A. Known Fiducial Sets During Normal Runtime Operation The system and method employs a plurality of fiducial sets with well-known geometry. These are described generally in the above-incorporated U.S. Patent applications. During our normal runtime operation the process leverages these fiducial sets and the vehicle's sensor systems in such a way that it can continuously monitor camera calibration. For example, tool variants include a set of ArUco markers with specified relative poses. In the process of performing a disconnection of the pneumatic line from the trailer gladhand, the process should determine the pose of the tool on the face of a trailer. To accomplish such pose determination the robot arm 270 is moved using an algorithm informed by our current best-estimate of the tool pose, and as the arm moves, process generates and stores new images and updates this best estimate. Eventually this motion and estimation loop terminates and the process achieves an improved knowledge of pose of the tool (within some uncertainty bounds). This operation requires the camera calibration. The collected data from this operation is stored, and is used in parallel during runtime operation of the arm, to compute statistical assessments of the camera calibration itself. Notably, this continuous calibration update process allows the system to determine if the camera calibration has drifted and requires a re-calibration procedure. Such re-calibration can be carried out by a user based upon an alert, or can be automatically performed using certain known-position/orientation fiducials.

B. Automated Calibration through Maintenance Routines

For both the camera calibration and the PTU calibration developed toolboxes that allow a technician with no expertise on the calibrations themselves to run these tools and allow the system to automatically collect the necessary data and run the optimizations to determine the calibrations. Such optimization can be implemented as part of normal runtime procedures. By way of example every time the truck is charge the line connection/disconnection system can automatically unstow the arm and self-run various calibration procedures. If any of the calibrations have changed they can automatically be updated. For the end-of-arm camera 620 calibration a known fiducial set mounted in a static location on the truck can be used to perform such self-calibration. This could potentially be served by the tool in its stowed position. Similarly, for the PTU calibration the arm can be moved to a region where the external environment scanner 610 is able to build high resolution scans of a known portion of the arm. The arm has internal encoders/steppers that provide feedback for such know position. By way of non-limiting example, a calibrated corner cube grasped by the grippers on the end effector 274 can be used. However, the actual gripper finger structure can be located for calibration free of a separate calibration object.

V. GLADHAND MOTION PLANNING AND PROCESSES

The following procedures can be employed to guide the motion of the end effector 274 of the robot arm 270 within the defined space of motion derived above.

A. Force Switch Servoing

The following arm guidance operations can be undertaken by the system and method employing and external switch: (a) moving the arm along a trajectory until a rising or falling edge on the external switch is sensed; (b) moving the arm along a trajectory whose speed is controlled by wrench readings from an end-of-arm force-torque sensor; (c) moving the arm along a predetermined trajectory while monitoring end-effector wrenches and stopping the arm if it is determined that there is a risk of causing the robot controller to fault; (d) moving the arm along a predetermined trajectory to produce a target end-effector wrench; and/or (e) stopping the motion for any of procedures (a)-(d), above, if the arm's trajectory has exceeded distance thresholds.

These capabilities can be used while stowing the tool or arm, while connecting and disconnecting adapter-based tools, while capturing the gladhand wedge with the fingers of an adapterless tool on the end effector, while performing expose moves to rotate spring-loaded gladhands away from the trailer face, and/or other procedures. These functions can be implemented using a single ForceSwitchServo interface. The interface has enums for various combinations of the above operations, it allows specifying arbitrary switches in the system to monitor, it allows on-the-fly biasing/unbiasing of the end-of-arm force-torque sensor, and/or other processes.

B. Motion Planning for Exposing Gladhand Sealing Surface

The adapterless tool can include a pivoting mechanism that allows grabbing a spring-loaded gladhand wedge from the back as described generally in the above-incorporated U.S. patent application Ser. No. 17/009,620, now U.S. Published Application No. US-2021-0053407-A1. As the arm is used to rotate the spring-loaded gladhand away from a trailer face to expose its sealing gland, it is also used to rotate the tool's pivoting mechanism to change the tool's state. This set of rotations (exposing the gladhand and rotating the tool's pivot) can be accomplished sequentially in either order or they can be accomplished at the same time. Fundamentally the motion of the arm, specifically the instantaneous center of rotation of the gripper fingers projected onto the plane defined by the tool's pivot axis and the gladhand's rotation axis, defines how much rotation occurs around the gladhand versus the tool pivot. Setting the instantaneous center to be coincident with the gladhand rotation axis will only extract/expose the gladhand, and setting it to be coincident with the tool pivot point will only rotate the tool. Setting the center elsewhere will allow rotation of both the retractable gladhand and the tool. However, the center should not be arbitrarily set so as to adhere to any constraints imposed by the now-closed system. In other words, if the arm is moved along constraint-incompatible directions, such can cause undesirable reaction forces in the gladhand and/or tool.

Hence, in order to accomplish both of these rotations, a motion planning technique is employed by the system and method that develops collision-free paths that avoid singularities and joint limits by exploring and exploiting the following freedoms: (a) the (e.g.) 7-DOF arm system has an infinite number of inverse kinematics (IK) solutions for aligning the tool's fingers with the gladhand wedge—some of these solutions may be infeasible for accomplishing the subsequent rotations; (b) while the tool pivot angle should achieve enough rotation to switch the tool state, the gladhand expose angle only needs to expose the gladhand enough to allow the switched state tool to be able to clamp the face—for various gladhand poses and corresponding IK solutions, increasing or decreasing the gladhand exposure angle (as long as it is above its minimum value) may help to avoid collisions, singularities, etc.; and (c) the set of constraint-compatible motions between the initial gladhand and tool angles and the final tool and gladhand angles is infinite. Freedom of choice in this set may help to avoid infeasible motions.

C. Dynamically Computed Approach Angle

As described generally arm tools can be bistable, and thereby allow the tool's wedge capture fingers to be positioned at two separate orientations relative to the robot's standard gripper fingers where they grasp the tool. The capture fingers also allow the capture of the wedge from two different approach angles. There is also a capability of switching the tool's state by using its stow stand. Thus, by pushing against the stand in well-defined motions it is possible to switch the tool state. During system runtime operation, a process can determine if the trailer employs a fixed gladhand type or a rotational gladhand type through any of the following procedures: (a) probabilistic classification vector machine logic deep learning-trained gladhand classifiers; (b) simple perception algorithms that project detected gladhand wedge poses into truck fixed frames and compute whether the gladhand is close to the trailer face (indicating rotational gladhand) or projecting out from the trailer front (indicating a fixed gladhand); and/or (c) remote assist mechanism(s) that allow a remote operator to classify a gladhand as fixed or rotational.

The above techniques (a)-(c) can be used in conjunction with each other, or selectively as fallback techniques if any particular technique fails to yield a desired outcome. For example, if a deep learning model is able to classify with high confidence, such can be employed. If the model cannot successfully classify (which sometimes occurs when the same gladhand body can be rotational or fixed) then the system process can fallback to geometric perception techniques. If those techniques produce an ambiguous result, then the system process can utilize a remote assist request as a final fallback.

Once the system determines if a gladhand is rotational or fixed, such can dictate the subsequent steps in the line connection procedure. This includes modifications to how the robotic arm and tool is unstowed, which approach angles are used for travel to the gladhand, and which motion planning and execution algorithms are used to actually accomplish the connection sequence.

VI. CONCLUSION

It should be clear that the above-described system and method provides an effective and efficient technique for guiding a robotic arm and end effector, with appropriate tool, to and from a gladhand on the front of the trailer body, regardless of obstructions or other occluding surfaces. The technique allows for continuous improvement and update of both sensor calibration and robotic function. Moreover, various systems and methods described herein any allow for optimization of the path of travel, and avoidance of conditions that would damage either the trailer or the gladhand handling tools on the robotic arm.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub—processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A system for guiding a robotic arm on an AV truck, adapted to connect a pneumatic line to a gladhand on the trailer front hitched thereto, comprising:
a first 3D sensor that generates pointclouds, at different stages of motion, located adjacent to an end of the robotic arm, the end carrying a tool for interacting with the gladhand;
an occlusion map of the trailer front;
a map update process that, based upon the pointclouds of the first 3D sensor, updates the occlusion map to add and remove voxels therefrom; and
a robot arm control process that guides the robotic arm based upon the updated occlusion map, in which the robot arm motion control process provides motion commands to the robotic arm while tracking movement of the robotic arm based upon position feedback therefrom.

2. The system as set forth in claim 1, further comprising, a second 3D sensor that generates a pointcloud, located at on the truck to image the trailer front and an occlusion mapping process that, based upon the pointcloud of the second 3D sensor, generates the occlusion map of the trailer front.

3. The system as set forth in claim 2 wherein the second 3D sensor is located at an elevated position on the truck.

4. The system as set forth in claim 2 wherein the robot arm control process is adapted to initially move the robotic arm to image, with the first 3D sensor, a region of interest subject to update by the update process.

5. The system as set forth in claim 4 wherein the first 3D sensor generates images used to locate predetermined features in the region of interest.

6. The system as set forth in claim 5 wherein the predetermined features include the gladhand.

7. The system as set forth in claim 6 wherein the gladhand is a rotating gladhand and the tool is adapted to extend the rotating gladhand upon recognition of such as one of the predetermined features.

8. The system as set forth in claim 6 wherein the second 3D sensor comprises a combination of a rotating 2D LiDAR and a moving pan-tilt unit.

9. The system as set forth in claim 6 wherein the first 3D sensor comprises a stereoscopic camera arrangement.

10. The system as set forth in claim 2, further comprising a map expansion process that changes an occlusion probability of each of the voxels in the updated occlusion map based upon occlusion state of neighboring voxels in the updated occlusion map.

11. The system as set forth in claim 2 wherein at least one of the first 3D sensor and the second 3D sensor is adapted to perform self-calibration during runtime operation based upon features within an imaged scene.

12. The system as set forth in claim 2 wherein a path of motion of the robotic arm is guided based, in part, on at least one of (a) moving the robotic arm along a trajectory until a rising or falling edge on an external switch is sensed, (b) moving the robotic arm along a trajectory whose speed is controlled by wrench readings from an end-of-arm force-torque sensor, (c) moving the robotic arm along a predetermined trajectory while monitoring end-effector wrenches and stopping the arm if it is determined that there is a risk of causing a controller of the robotic arm to fault, (d) moving the robotic arm along a predetermined trajectory to produce a target end-effector wrench, and (e) stopping the motion for any of (a)-(d) if a motion trajectory of the robotic arm has exceeded distance thresholds.

13. The system as set forth in claim 2 wherein the predetermined feature comprises a gladhand and the occlusion on the trailer front is caused by a protrusion from the trailer front that overhangs the gladhand.

14. The system as set forth in claim 13 wherein the protrusion is a refrigeration unit.

15. A method for guiding a robotic arm on an AV truck, adapted to connect a pneumatic line to a gladhand on the trailer front hitched thereto, comprising the steps of:
generating pointclouds, at different stages of motion of the robotic arm with a first 3D sensor located adjacent to an end of the robotic arm, in which the end includes a tool for interacting with the gladhand;
providing an occlusion map of the trailer front;
updating the occlusion map based upon the pointclouds of the first 3D sensor to add and remove voxels therefrom; and
guiding the robot arm based upon the updated occlusion map, including providing the robot arm with motion commands while tracking movement of the robotic arm, based upon motion feedback therefrom.

16. The method as set forth in claim 15, further comprising, generating a pointcloud of the front of the trailer with a second 3D sensor located on the truck and generating the occlusion map based upon the pointcloud of the second 3D sensor.

17. The method as set forth in claim 16, further comprising, initially moving the robot to image, with the first 3D sensor, a region of interest subject to update by the update process.

18. The method as set forth in claim 17, further comprising locating the gladhand in the region of interest with images from the first 3D sensor.

19. The method as set forth in claim 16, further comprising, changing an occlusion probability of each of the voxels in the updated occlusion map based upon occlusion state of neighboring voxels in the updated occlusion map.

20. The method as set forth in claim 19, further comprising, performing, with at least one of the first 3D sensor and the second 3D sensor, self-calibration during runtime operation based upon features within an imaged scene.

21. The method as set forth in claim 20, further comprising, guiding a path of motion of the robotic arm based, in part, on at least one of (a) moving the robotic arm along a trajectory until a rising or falling edge on an external switch is sensed, (b) moving the robotic arm along a trajectory whose speed is controlled by wrench readings from an end-of-arm force-torque sensor, (c) moving the robotic arm along a predetermined trajectory while monitoring end-effector wrenches and stopping the arm if it is determined that there is a risk of causing a controller of the robotic arm to fault, (d) moving the robotic arm along a predetermined trajectory to produce a target end-effector wrench, and (e) stopping the motion for any of (a)-(d) if a motion trajectory of the robotic arm has exceeded distance thresholds.

22. A device that guides a robotic arm on an AV truck, adapted to connect a pneumatic line to a gladhand on the trailer front hitched thereto, comprising:

a first 3D sensor that generates pointclouds, at different stages of motion, located adjacent to an end of the robotic arm, the end carrying a tool for interacting with the gladhand;

an occlusion map of the trailer front;

a map update process that, based upon the pointclouds of the first 3D sensor, updates the occlusion map to add and remove voxels therefrom; and a robot arm control process that, based upon motion commands provided to the robotic arm while tracking movement of the robotic arm based upon position feedback therefrom, guides the robotic arm based upon the updated occlusion map.

23. The device as set forth in claim 22, further comprising a second 3D sensor that generates a pointcloud, located at on the truck to image the trailer front and an occlusion mapping process that, based upon the pointcloud of the second 3D sensor, generates the occlusion map of the trailer front.

24. The device as set forth in claim 23, wherein the second 3D sensor is located at an elevated position on the truck.

25. The device as set forth in claim 23, wherein the robot arm control process is adapted to initially move the robotic arm to image, with the first 3D sensor, a region of interest subject to update by the update process.

26. The device as set forth in claim 25, wherein the first 3D sensor generates images used to locate predetermined features in the region of interest.

27. The device as set forth in claim 26, wherein the predetermined features include the gladhand.

28. The device as set forth in claim 27, wherein the gladhand is a rotating gladhand and the tool is adapted to extend the rotating gladhand upon recognition of such as one of the predetermined features.

29. The device as set forth in claim 23, wherein the second 3D sensor comprises a combination of a rotating 2D LiDAR and a moving pan-tilt unit.

30. The device as set forth in claim 22, wherein the first 3D sensor comprises a stereoscopic camera arrangement.

31. The device as set forth in claim 22, further comprising a map expansion process that changes an occlusion probability of each of the voxels in the updated occlusion map based upon occlusion state of neighboring voxels in the updated occlusion map.

32. The device as set forth in claim 23, wherein at least one of the first 3D sensor and the second 3D sensor is adapted to perform self-calibration during runtime operation based upon features within an imaged scene.

33. The device as set forth in claim 22, wherein a path of motion of the robotic arm is guided based, in part, on at least one of (a) moving the robotic arm along a trajectory until a rising or falling edge on an external switch is sensed, (b) moving the robotic arm along a trajectory whose speed is controlled by wrench readings from an end-of-arm force-torque sensor, (c) moving the robotic arm along a predetermined trajectory while monitoring end-effector wrenches and stopping the arm if it is determined that there is a risk of causing a controller of the robotic arm to fault, (d) moving the robotic arm along a predetermined trajectory to produce a target end-effector wrench, and (e) stopping the motion for any of (a)-(d) if a motion trajectory of the robotic arm has exceeded distance thresholds.

34. The device as set forth in claim 26, wherein the predetermined features include a gladhand and the occlusion on the trailer front is caused by a protrusion from the trailer front that overhangs the gladhand.

35. The device as set forth in claim 34, wherein the protrusion is a refrigeration unit.

* * * * *